March 14, 1939. E. RONNEBERG 2,150,189
DRILL CHUCK FOR MINE DRILLING MACHINES
Filed Jan. 17, 1938
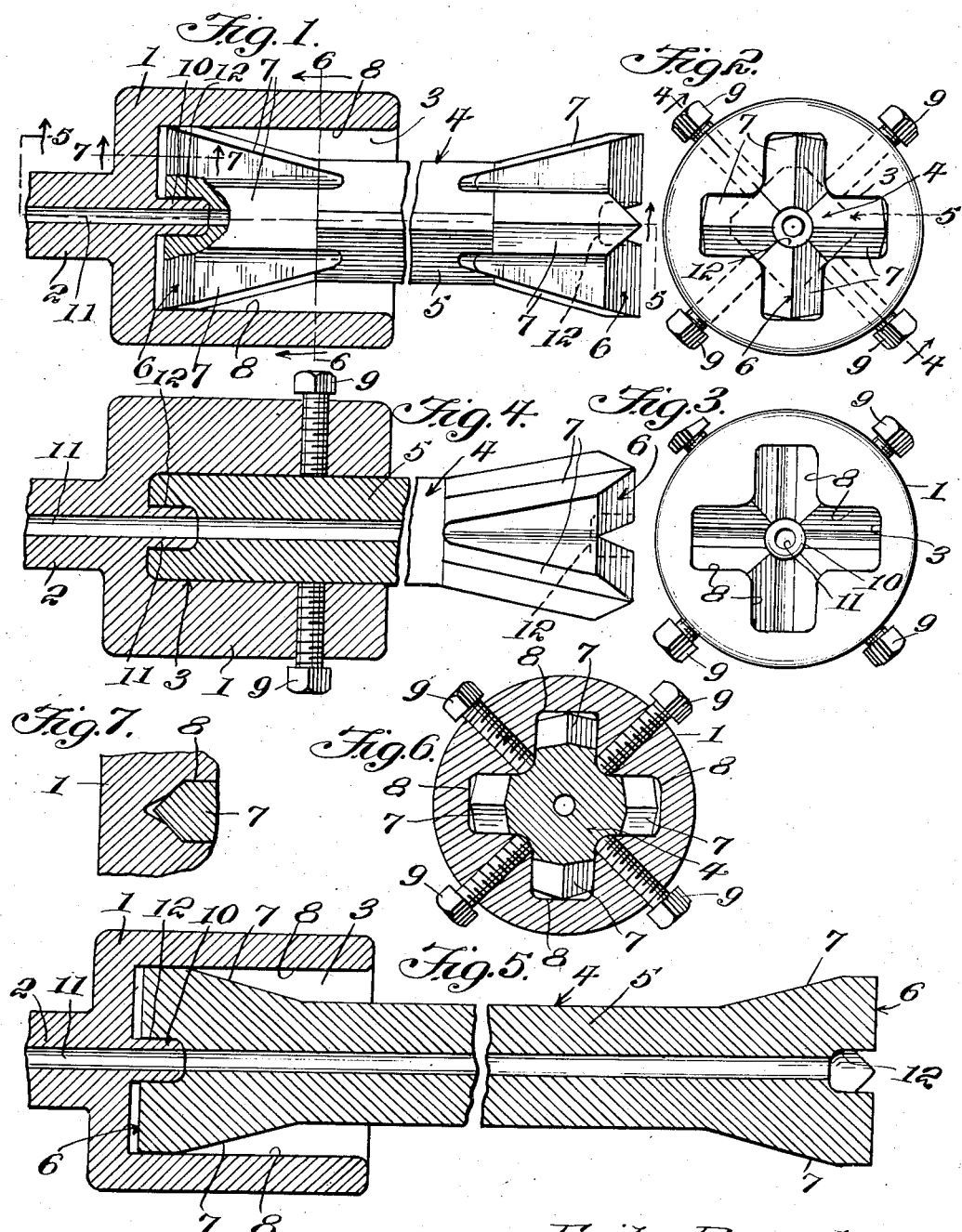
Erik Ronneberg
INVENTOR
BY Victor J. Evans & Co.
ATTORNEYS
WITNESS J. T. L. Wright Patented Mar. 14, 1939

2,150,189

UNITED STATES PATENT OFFICE 2,150,189

DRILL CHUCK FOR MINE DRILLING MACHINES

Erik Ronneberg, Lead, S. Dak.

Application January 17, 1938, Serial No. 185,429

1 Claim. (Cl. 255—63)

This invention relates to chucks for mine drilling machines and has for the primary object the provision of an efficient and inexpensive device of this character which embodies a construction to permit the use of drills having cutting means at each end, said construction being capable of receiving and having secured therein either cutting end of the drill so that when one cutting end of the drill becomes dull or damaged, the other cutting end may be brought into use whereby the drill bit may be employed for a much longer period of time before it is necessary to return said drill bit to a shop or like place for reconditioning.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a fragmentary vertical sectional view illustrating a drill chuck having adapted thereto a drill bit provided with cutting means at each end.

Figure 2 is an end elevation illustrating the same.

Figure 3 is an end view of a chuck with the drill bit removed.

Figure 4 is a sectional view taken on the line 4—4 of Figure 2.

Figure 5 is a sectional view taken on line 5—5 of Figure 1.

Figure 6 is a transverse sectional view taken on line 6—6 of Figure 1.

Figure 7 is a detail sectional view taken on line 7—7 of Figure 1.

Referring in detail to the drawing, the numeral 1 indicates a chuck head integral with an attaching shank 2 of any well known construction for connecting the chuck head to a mine drilling machine (not shown). The chuck head has formed therein a drill receiving socket 3 opening outwardly through one end of the chuck head to permit insertion of a drill bit 4. The drill bit includes a shank 5 having formed on each end thereof cutting means 6 in the form of ribs 7 which taper towards the medial portions of the shank 5. The cutting means 6 is of a conventional construction and the only difference in the present invention over a conventional type of drill bit is the use of cutting means at each end of the drill bit giving the drill bit double life over a drill bit simply having a cutting means at one end. Either of the cutting ends of the drill bit may be received in the socket of the chuck head, the latter being provided with longitudinally extending spaced grooves 8 in the walls of the socket to receive the ribs 7 of the cutting means 6.

To secure either cutting end of the drill bit in the socket of the chuck head, the latter is provided with set bolts 9 adapted to be turned into engagement with the shank of the drill bit for firmly anchoring the latter in the chuck head.

A nipple 10 is formed on the chuck head within the socket 3 thereof and communicates with a fluid passage 11 formed in the shank 2 of the chuck head and is adapted to enter a fluid bore 12 formed in the drill bit and which extends the full length of the latter so that fluid may be passed through the cutting end of the drill bit when in operation. The nipple may fit into either end of the bore 12 so that fluid may be passed into the bore 12 when either cutting end of the drill bit is positioned for work outwardly of the chuck head. The cross sectional shape of the grooves 8 is such as to not mar or damage the cutting edges of the cutting means.

What is claimed is:

In combination with a drill bit having cutting means at each end, a chuck head having a socket to receive either end of the drill bit, said chuck head having grooves formed in the walls of the socket to receive either of the cutting means of the drill bit, means for releasably securing the drill bit in the socket of the chuck head, said grooves being of a cross sectional shape to protect either of the cutting means of the drill bit when positioned therein, said chuck head including an attaching shank having a fluid passage, and a nipple formed in the chuck head with the fluid passage extending therethrough to enter a fluid passage of the drill bit.

ERIK RONNEBERG.